United States Patent [19]
Leibovitz

[11] 4,455,721
[45] Jun. 26, 1984

[54] EXTERNAL CLAMPING DEVICE FOR INFLATABLE AIR BAG

[76] Inventor: Howard Leibovitz, 505 N. Lake Shore Dr., Chicago, Ill. 60611

[21] Appl. No.: 424,312

[22] Filed: Sep. 13, 1982

[51] Int. Cl.³ .............................................. B65B 63/00
[52] U.S. Cl. ...................................... 24/346; 24/514; 24/535
[58] Field of Search ............... 24/327, 243 B, 248 SA, 24/248 R, 265 EC, 255 R, 201 C

[56] References Cited
U.S. PATENT DOCUMENTS 3,247,852  4/1966  Schneider .......................... 24/248 R
3,986,746  10/1976  Chartier ............................ 24/248 R

*Primary Examiner*—Robert Peshock
*Attorney, Agent, or Firm*—Haight, Hofeldt, Davis & Jambor

[57] ABSTRACT

An external clamping device for high pressure inflatable air bags utilizes opposed bracket members. An engaging structure, such as a set of teeth designed to grip the material of the inflatable air bag without damaging it, is formed adjacent one end of each of the bracket members. A stepped shoulder is formed at the other end of each of the brackets, so that when the opposing brackets are brought together the stepped shoulders abut one another to preclude pivoting of the bracket members during tightening. Tightening of the bracket members to firmly grip the air bag is achieved by a bolt threaded into openings intermediate the ends of the bracket members. When the bracket members are joined together, a connecting hole is formed for attaching the clamping device to a positioning arrangement.

13 Claims, 11 Drawing Figures

U.S. Patent   Jun. 26, 1984   Sheet 1 of 3   4,455,721
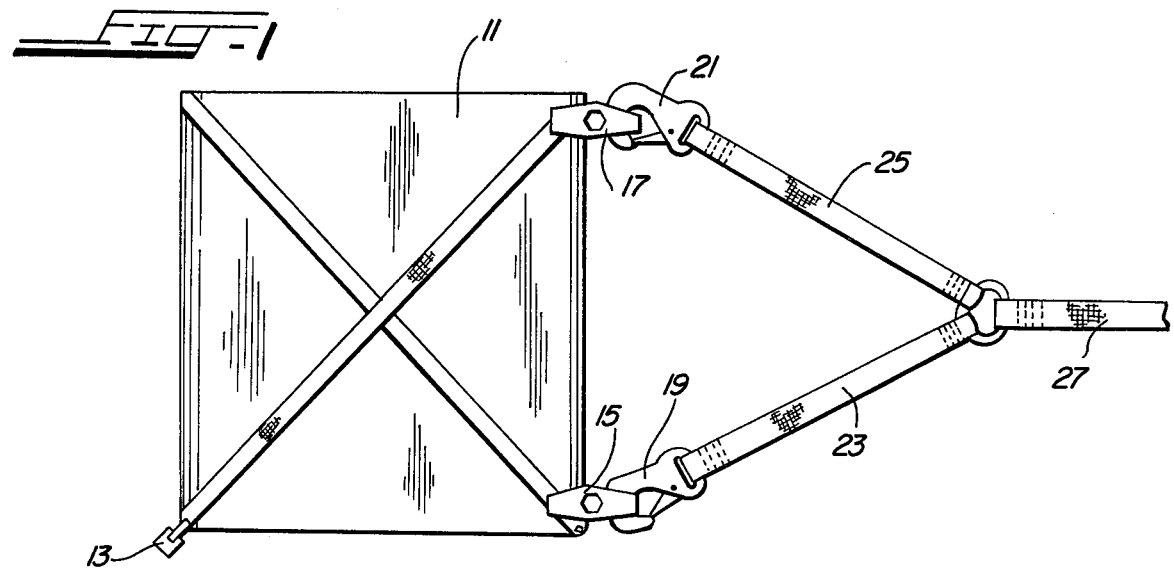
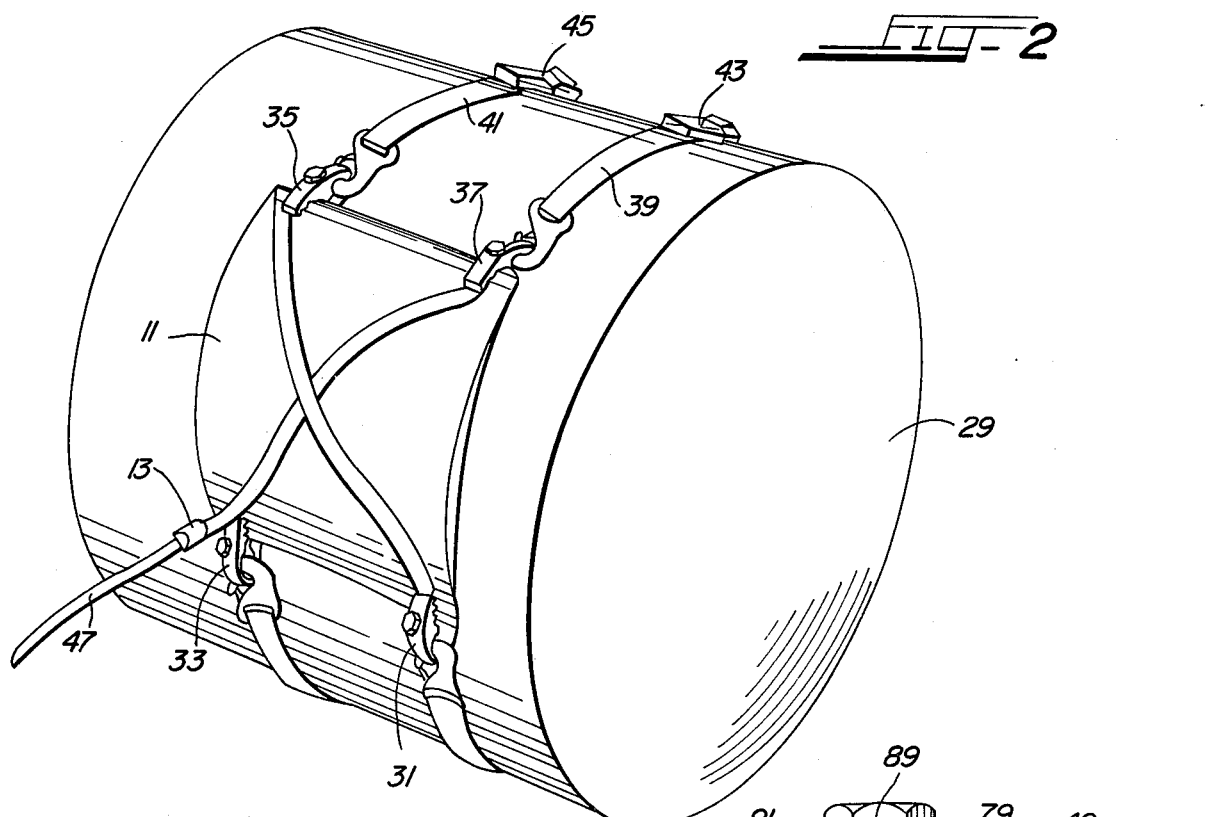
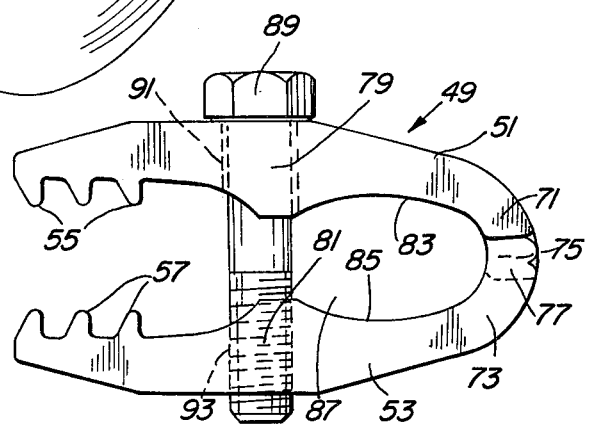

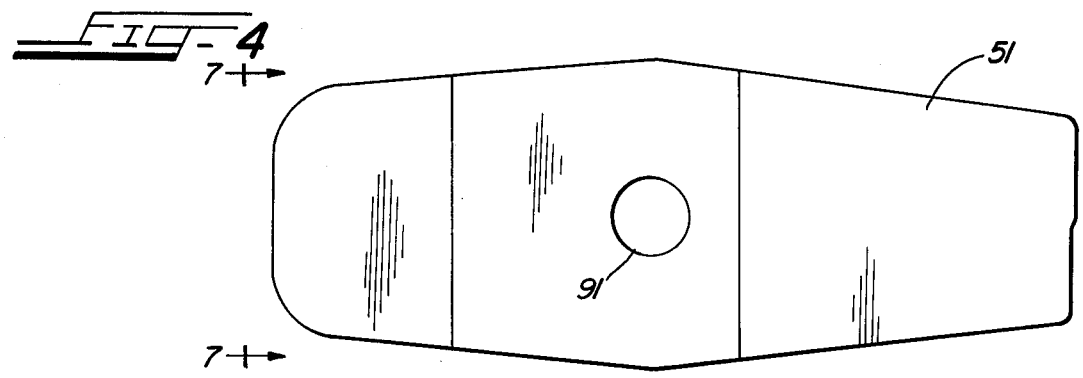
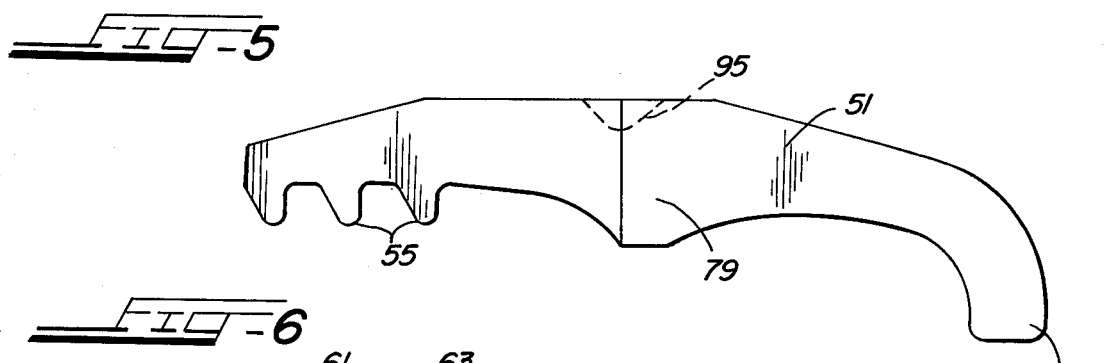
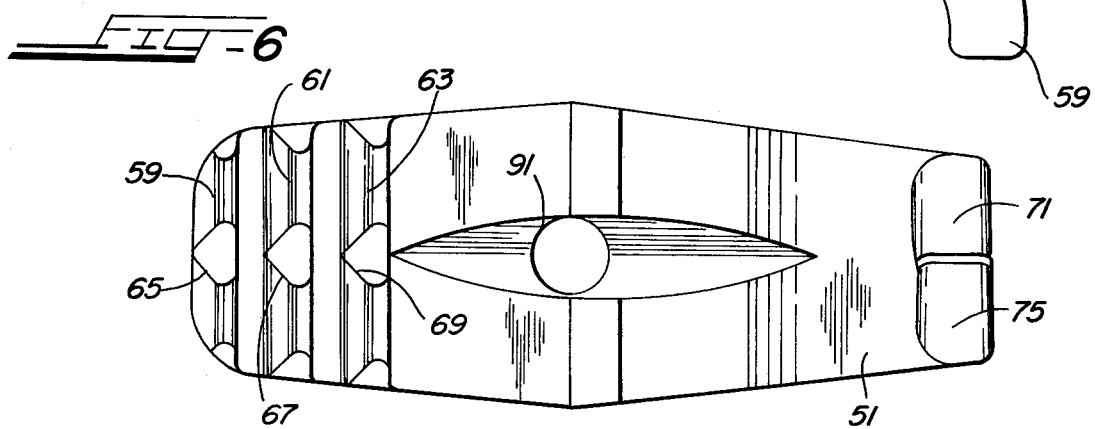
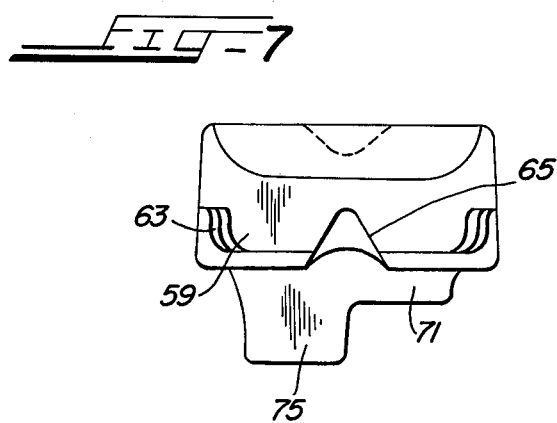

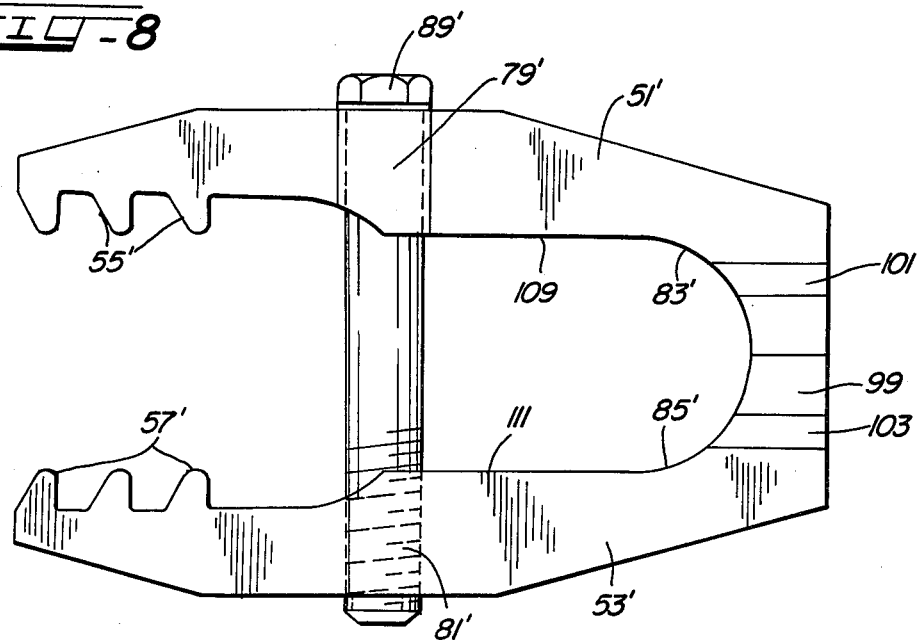
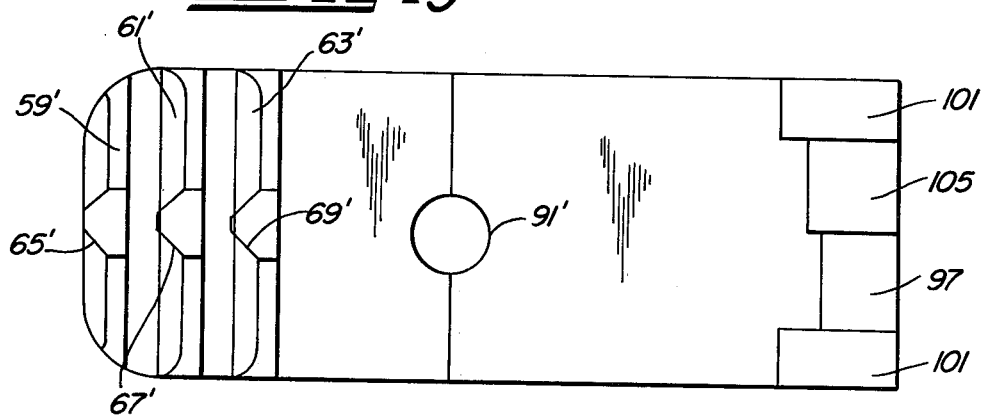
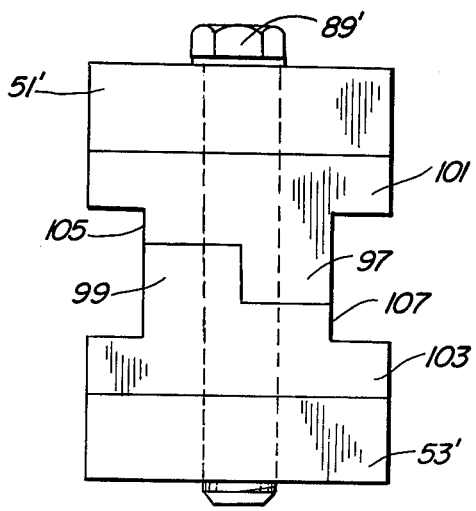
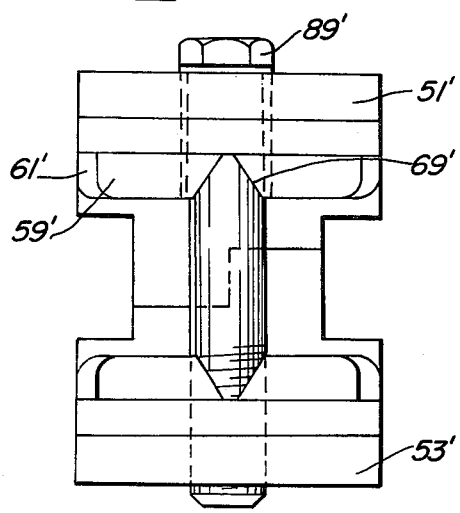

EXTERNAL CLAMPING DEVICE FOR INFLATABLE AIR BAG

BACKGROUND OF THE INVENTION

1. Field of the Invention

This invention relates generally to high pressure inflatable air bags utilized for lifting and sealing, and more specifically, this invention relates to an external clamping device to grip inflatable air bags to permit desired positioning of the air bags without damaging the expandable material of which they are formed.

2. Description of the Prior Art

High pressure inflatable air bags have become useful in a variety of applications, including such applications as the lifting of weight, the forcible separation of adjacent masses and the sealing of large tanks and conduits. These air bags have the advantage of being able to fit in a space of only a few inches, prior to inflation. They also have the advantage of being able to generate very large forces without cumbersome and awkward mechanical equipment.

Generally, these air bags are formed from a resilient or expandable material, such as rubber, reinforced with a strengthening arrangement, such as a wire matrix.

While such high pressure inflatable air bags have many advantages, they must still be properly positioned in order to be able to produce the desired results. Thus, when an air bag is to be positioned in a very narrow space, such as in a missile silo or a rock quarry, or is to be positioned in a number of hard to reach locations such as under a low slung large vehicle, difficulties are frequently encountered. There are also difficulties in positioning the air bags for sealing large vessels or pipes.

Attempts have been made to mold a rubber strap or fabric reinforced strap into the air bags to provide a handle for positioning. One of the problems encountered in these approaches is the limited strength of the strap. Efforts to strengthen the strap have created problems in the manufacture of the bag. Thus, one is left with a relatively weak strap, which cannot be replaced when it breaks.

Another approach has been to try and mold clamps into the material of the air bag itself. The problem with this approach is that it has weakened the air bag at that point, so that either the air bag fails or the clamp is ripped out, rendering the air bag unusable.

Since such inflatable air bags require an expandable material, the expandable material must be relatively soft. Rubber is commonly used as the expandable material, and any rubber that provides the desired expansion is sufficiently soft to be subject to cutting or tearing, presenting the possibility of leakage when the air bag is pressurized.

Also, since the problem is primarily encountered in positioning the air bags in relatively small spaces, any clamping arrangement must have a relatively low profile in order to permit the air bag with attached clamps to fit into the desired space. This means that the relatively high clamping force must be achieved by a device that has a relatively low profile or total thickness, and which does not jeopardize the material of the air bag.

SUMMARY OF THE INVENTION

With the present invention, an external clamping device having the desired clamping force and relatively low profile, and which also minimizes the danger of damaging the air bag material, may be realized.

Two opposing parts or bracket members are utilized in the present invention to provide a device for externally clamping high pressure inflatable air bags. While these opposing bracket members may be separately formed, cost and manufacturing ease suggest that a single form of the bracket member is the most expeditious route to follow. Accordingly, that is the approach that is shown and described in connection with the preferred embodiments disclosed herein.

Each of the bracket members has an elongated body. An air bag engaging structure, such as a set of extending teeth, is formed on one side of the bracket member body adjacent a first end thereof. These teeth are appropriately formed, such as by rounding the corners, to grip the air bag while minimizing the risk of damage to the air bag material, such as by cutting or tearing.

At the other end of the bracket member body a stepped shoulder is formed. This stepped shoulder is formed in such a way that when two opposing bracket members are brought together the stepped shoulders will abut one another. This precludes pivoting or twisting of the bracket members as they are tightened to grip the air bag, thus permitting a greater gripping strength.

Intermediate the two ends of the bracket member, a threaded opening is formed through the bracket member. This threaded opening is placed through the thickest portion of the bracket member body. The teeth, which are arranged in a substantially straight line, do not extend substantially beyond the thickest portion of the bracket member. However, a curved surface is formed towards the other end of the bracket member so that the stepped shoulders extend substantially beyond the thickest portion of the bracket member body. This curved surface may extend completely between the thickest portion of the bracket member body and the stepped shoulder, or it may be formed at the end of a substantially flat surface extending from the thickest portion of the bracket member.

When opposing bracket members are positioned with the stepped shoulders abutting one another, a conventional bolt may be threaded through the threaded openings to provide a mechanism for releasably tightening the bracket members to grip the air bag between the opposing sets of teeth. When the bracket members are brought together in this way, the curved surfaces cause a connecting hole to be formed between the bolt and the stepped shoulders. This connecting hole may be attached, such as by a snap hook passed through the connecting hole, to an appropriate positioning arrangement. This positioning arrangement may take the form of a set of straps or belts.

In this way, a relatively low profile device is provided for externally clamping an inflatable air bag, while providing for attachment to a suitable positioning arrangement. The inflatable air bag is firmly gripped, while the risk of damage to the air bag is minimized. Therefore, the desirable operating features of the inflatable air bag may be more readily utilized, and the use of the inflatable air bags may be extended into environments where such use has previously been restricted.

These and other objects, advantages and features of this invention will hereinafter appear, and for purposes of illustration, but not of limitation, exemplary embodiments of the subject invention are shown in the appended drawing.

BRIEF DESCRIPTION OF THE DRAWING

FIG. 1 is a top plan view of an inflatable air bag in which the external clamping devices of the present invention are shown connected to a positioning arrangement.

FIG. 2 is a perspective view of a tank with an inflatable air bag positioned for sealing by use of external clamping devices of the present invention.

FIG. 3 is a side elevational view of a first embodiment of an external clamping device constructed in accordance in with the present invention.

FIG. 4 is a top plan view of the external clamping device of FIG. 3.

FIG. 5 is a side elevational view of the top bracket member of the external clamping device of FIG. 3.

FIG. 6 is a bottom plan view of the bracket member of FIG. 5.

FIG. 7 is a left end elevational view taken along lines 7—7 of FIG. 4.

FIG. 8 is a side elevational view of a second embodiment of an external clamping device constructed in accordance with the present invention.

FIG. 9 is a bottom plan view of the top bracket member of FIG. 8.

FIG. 10 is a right end elevational view of the bracket member of FIG. 9.

FIG. 11 is a left end elevational view of the bracket member of FIG. 9.

DETAILED DESCRIPTION OF THE PREFERRED EMBODIMENT

A high pressure inflatable air bag 11 is illustrated in FIG. 1. The high pressure inflatable air bag 11 is a known type of such air bag, usually formed of an expandable rubber with a reinforcing matrix of wires embedded in the rubber. An inlet for the high pressure inflating air is illustrated at 13.

A pair of external clamp devices 15 and 17, constructed in accordance with the present invention, are shown affixed to air bag 11. Each of the external clamping devices 15 and 17 is shown connected to corresponding snap hooks 19 and 21. A positioning arrangement for the air bag 11 is then provided by the belts or straps 23, 25 and 27. With this arrangement, the air bag 11 may be accurately positioned in small spaces up to a considerable distance away from the operator.

A cylindrical tank 29 is shown in FIG. 2 with air bag 11 positioned to provide a sealing function. In this case, four of the external clamping devices, 31, 33, 35 and 37, are utilized. Straps or belts 39 and 41 extend between clamping devices 31 and 37, and between clamping devices 33 and 35, respectively. Take-up ratchets 43 and 45 are utilized to remove any slack in the straps 39 and 41, respectively. High pressure air is provided for air bag 11 at input nozzle 13 by an appropriate line 47.

FIG. 3 illustrates a first embodiment 49 of an external clamping device constructed in accordance with the present invention. Clamping device 49 includes a first elongated bracket member 51 and a second elongated bracket member 53. In this preferred embodiment, bracket members 51 and 53 are identical.

The elongated body of bracket member 51 has a set of teeth 55 formed adjacent one end thereof, while a corresponding set of teeth 57 is formed adjacent the corresponding end of the elongated body of bracket member 53. As may be seen from FIGS. 3 and 5, the teeth 55 and 57 are arranged in substantially a straight line to provide uniform gripping of the air bag. As seen in these two FIGURES, the teeth 55 and 57 are provided with rounded corners so that there are no sharp edges to cut or tear the material of air bag 11.

By reference to FIG. 6, it may be seen that the teeth 55 and 57 are actually formed from extending ridges 59, 61 and 63. These ridges are divided by notches 65, 67 and 69, respectively, to provide a total of six teeth. Of course, the teeth could be formed in any suitable manner and in any desired number. However, the lateral extent of the teeth in this preferred embodiment provides a desirable distribution of the clamping force, which not only enhances the gripping action but also strengthens the teeth and decreases the chance of tooth breakage.

At the other end of the elongated body of bracket member 51, a stepped shoulder 71 is provided, and a similar stepped shoulder 73 is provided on bracket member 53. An extending portion 75 of stepped shoulder 71 and an extending portion 77 of stepped shoulder 73 abut one another when bracket members 51 and 53 are brought into conjunction. This abutment between the stepped shoulders 71 and 73 precludes pivoting of these bracket members during tightening of the clamping device, so that a better grip may be achieved on the air bag.

In order for the stepped shoulders 71 and 73 to be positioned in abutment, they must extend substantially beyond the thickest portions 79 and 81 of bracket members 51 and 53, respectively. This relationship is achieved as a result of the formation of the curved surfaces 83 and 85, which, in this embodiment, extend completely from the thickest portions 79 and 81 to the stepped shoulders 71 and 73. These curved surfaces 83 and 85 also define a connecting opening 87. It is through connecting opening 87 that snap hooks, such as 19 and 21 in FIG. 1, or any other suitable interconnecting type of device, may be inserted to attach the clamps to a suitable positioning arrangement for the air bags.

Connecting hole 87 extends from the ends of bracket members 51 and 53 on which the stepped shoulders 71 and 73 are formed to a bolt 89. Bolt 89 is the instrumentality by which the bracket members 51 and 53 are tightened to grip the air bag 11 and released from gripping the air bag. Bolt 89 is threaded through threaded openings 91 and 93, which are formed intermediate the ends of bracket members 51 and 53, respectively. It may be noted that the threaded openings 91 and 93 are formed through the thickest portions 79 and 81 of their respective bracket members 51 and 53. Although bolt 89 is shown as a conventional headed bolt, which would probably be the most desirable for most applications, it should be noted that if an even lower profile were desired, a counterbored fastener, such as an Allen screw, could be utilized, as illustrated by the counterbored section 95 in FIG. 5.

While the embodiment of FIGS. 3–7 is primarily intended for production by a forging process, a slightly altered design for machining is exemplified by the embodiment of FIGS. 8–11. It may be noted that this embodiment is substantially the same as the first embodiment, and hence corresponding parts have been identified by primed numerals.

There are really only two significant changes in this embodiment. The first relates to the stepped shoulders of bracket members 51' and 53'. As best seen in FIG. 10, not only are the projecting portions 97 and 99 of shoulders 101 and 103, respectively, stepped, but there are also additional steps 105 and 107.

The other change of some significance involves the curved surfaces 83' and 85'. As may be seen in FIG. 8, curved surfaces 83' and 85' no longer extend the entire distance from the thickest portions 79' and 81', respectively, to the stepped portions, but instead are located at the ends of relatively straight sections 109 and 111. The function is not greatly altered, but it provides a structure that is more easily machined.

It should be understood that various modifications, changes and variations may be made in the arrangement, operation and details of construction of the elements disclosed herein without departing from the spirit and scope of the invention.

I claim:

1. A device for externally clamping an inflatable air bag comprising:
   first engaging means located on a first bracket member adjacent a first end thereof to grip one side of the air bag without damaging the material thereof;
   second engaging means located on a second bracket member adjacent a first end thereof to grip the other side of the air bag without damaging the material thereof;
   releasable tightening means to cause said first and second engaging means to forcibly clamp said air bag therebetween;
   a stepped shoulder formed on the second end of each of said first and second bracket members, said stepped shoulders abutting one another to prevent pivoting of said bracket members as said tightening means is actuated to increase the clamping force on the air bag; and
   connecting means to permit the clamping device to be attached to an appropriate positioning arrangement.

2. A device as claimed in claim 1 wherein said first and second engaging means comprise first and second sets of teeth formed to grip opposing sides of the air bag without cutting or tearing the material thereof.

3. A device as claimed in claim 1 wherein said first and second bracket members are identical.

4. A device as claimed in claim 1 wherein said tightening means comprises a bolt threaded through openings formed in said first and second brackets intermediate the ends thereof.

5. A device as claimed in claim 4 wherein said connection means comprises a hole formed between said bolt and the second ends of said first and second brackets.

6. A device as claimed in claim 5 wherein said positioning arrangement comprises a snap hook to pass through said hole and a strap.

7. A device for externally clamping an inflatable air bag comprising:
   a first elongated bracket member;
   a first set of teeth formed adjacent a first end of said first bracket member, said teeth adapted to grip the air bag without damaging the material thereof;
   a first stepped shoulder formed at the second end of said first bracket member;
   a first threaded opening formed in said first bracket member intermediate the first and second ends thereof;
   a second elongated bracket member;
   a second set of teeth formed adjacent a first end of said second bracket member, said teeth adapted to grip the air bag without damaging the material thereof;
   a second stepped shoulder formed at the second end of said second bracket member;
   a second threaded opening formed in said second bracket member intermediate the first and second ends thereof;
   a tightening bolt threaded through said first and second threaded openings to force said first and second sets of teeth toward one another from opposing sides of the air bag to clamp the air bag therebetween, said first and second stepped shoulders abutting one another to preclude pivoting of said bracket members during tightening of said bolt; and
   a connecting hole formed between said bolt and said second ends of said bracket members to permit the clamping device to be attached to an appropriate positioning arrangement.

8. A device as claimed in claim 3 wherein each of said bracket members comprises:
   an elongated body; and
   a threaded opening formed in said body intermediate the first and second ends thereof.

9. A device as claimed in claim 8 wherein each of said first and second engaging means comprises a set of teeth formed to grip the air bag without cutting or tearing the material thereof.

10. A device as claimed in claim 9 wherein said threaded opening is formed through the thickest portion of said body.

11. A device as claimed in claim 10 wherein:
   said teeth are formed along a substantially straight line and do not extend substantially beyond the thickest portion of said body; and
   the section of said body between the thickest portion and the second end includes a curved surface extending said stepped shoulder substantially beyond the extent of said teeth.

12. A device as claimed in claim 11 wherein said curved surface extends the entire distance from the thickest portion of said body to said stepped shoulder.

13. A device as claimed in claim 11 wherein said curved surface is located at the end of a substantially flat surface extending form the thickest portion of said body.

* * * * *